United States Patent
Khripin

(10) Patent No.: US 10,870,315 B2
(45) Date of Patent: Dec. 22, 2020

(54) METHOD FOR IN SITU ISOMERIZATION OF POLYBUTADIENE

(71) Applicants: Constantine Khripin, Simpsonville, SC (US); Compagnie Generale des Etablissements Michelin, Clermont-Ferrand (FR)

(72) Inventor: Constantine Khripin, Simpsonville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 0 days.

(21) Appl. No.: 15/776,944

(22) PCT Filed: Nov. 30, 2016

(86) PCT No.: PCT/US2016/064230
§ 371 (c)(1),
(2) Date: May 17, 2018

(87) PCT Pub. No.: WO2017/095934
PCT Pub. Date: Jun. 8, 2017

(65) Prior Publication Data
US 2018/0326784 A1  Nov. 15, 2018

Related U.S. Application Data

(63) Continuation-in-part of application No. PCT/US2015/063000, filed on Nov. 30, 2015.

(51) Int. Cl.
*C08C 19/10* (2006.01)
*B60C 1/00* (2006.01)
*C08F 136/06* (2006.01)
*C08L 9/00* (2006.01)

(52) U.S. Cl.
CPC ............. *B60C 1/0016* (2013.01); *B60C 1/00* (2013.01); *C08C 19/10* (2013.01); *C08F 136/06* (2013.01); *C08L 9/00* (2013.01)

(58) Field of Classification Search
CPC ...... C08C 19/10; B60C 1/0016; C08F 136/06
See application file for complete search history.

(56) References Cited

U.S. PATENT DOCUMENTS

| 2,878,175 | A | | 3/1959 | Golub |
| 3,534,005 | A | | 10/1970 | Nudenberg et al. |
| 5,580,919 | A | * | 12/1996 | Agostini ............... B60C 1/0016 524/430 |
| 5,900,467 | A | * | 5/1999 | Wideman ................. C08K 5/47 524/494 |
| 6,255,397 | B1 | | 7/2001 | Sandstrom |
| 2002/0016219 | A1 | | 2/2002 | Halko et al. |
| 2003/0119989 | A1 | | 6/2003 | Ladd et al. |
| 2010/0186869 | A1 | | 7/2010 | Sandstrom et al. |
| 2012/0123018 | A1 | | 5/2012 | Kanz et al. |

FOREIGN PATENT DOCUMENTS

| GB | 1051333 A | | 1/2017 | |
| WO | WO-2010000294 A1 | * | 1/2010 | ........... B60C 1/0016 |

OTHER PUBLICATIONS

Europrene Neocis BR 40 datasheet (2015) (Year: 2015).*
International Search Report and Written Opinion dated Feb. 16, 2017.

* cited by examiner

*Primary Examiner* — Robert C Boyle
(74) *Attorney, Agent, or Firm* — John Steckler Schwab

(57) ABSTRACT

Methods for in situ isomerization if polybutadiene may include adding mixture components of the cross-linkable rubber composition into a mixer, the mixture components comprising at least 10 phr of a polybutadiene rubber having at least 80 wt % cis-bonds and up to 90 phr of a second rubber component having at least some dienic unsaturation and mixing the mixture components during a nonproductive phase. Such methods may include processing the mixture components on a mill during a productive phase, adding at least 3 phr of a disulfide isomerization agent and mixing the disulfide isomerization agent with the mixture components. The mixing may take place in an internal mixer with the isomerization agent added to the mixer or alternatively, it may be added to the mill after the mixture components have been dropped from the mixer for cooling on the mill.

17 Claims, 1 Drawing Sheet

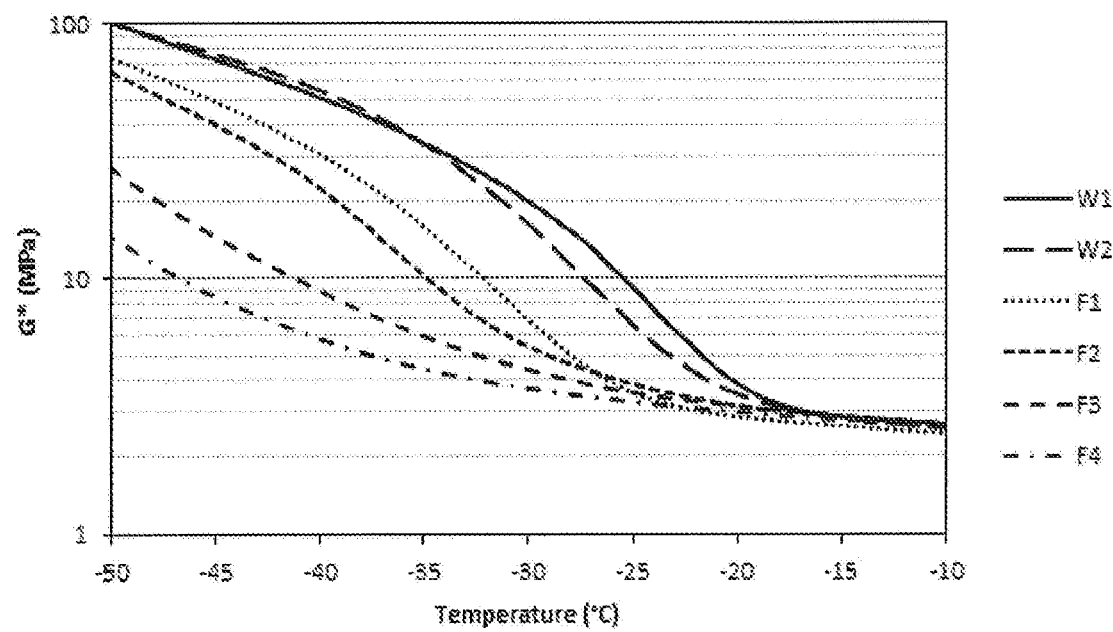

METHOD FOR IN SITU ISOMERIZATION OF POLYBUTADIENE

BACKGROUND OF THE INVENTION

Field of the Invention

This invention relates generally to isomerization of rubber and more particularly, to the isomerization of polybutadienes during the preparation and/or curing of rubber compositions.

Description of the Related Art

Tire designers must consider the environment in which their tires will be placed to ensure that they operate at the most efficient levels. Some examples are obvious such as snow tires and other winter tires that are designed specifically to perform well in snow and ice conditions with the addition of specific tread characteristics for optimal snow and ice traction. Another example that is not so obvious is the addition of antidegradants to a tire to help prevent tire damage from the environmental effect of ozone.

Tire designers must also consider the environment when choosing elastomers that are suitable for use. One very common elastomer used in tires is polybutadiene and a large amount of the polybutadiene manufactured today is used in the tire industry. It is known to be particularly useful for improving the wear performance in tires.

Polybutadiene is formed by the polymerization of 1,3-butadiene that produces three different forms within the polymer: cis-1,4, trans-1,4 and vinyl-1,2. As is well known in the art, the polymerization process used in the production of polybutadiene can affect the quantity of each form. For example the use of a neodymium catalyst may provide a polybutadiene having greater than 95% cis-1,4 bonds while the use of a lithium catalyst may provide a polybutadiene with a trans-1,4 content of 20% to 60% and a vinyl-1,2 content of 8-14%.

A problem faced by tire designers who would like to incorporate higher levels of polybutadiene in cold climate tires is that high cis-1,4 content polybutadienes become quite rigid at low temperatures, reaching a high shear modulus. This stiffening is due to crystallization of the polymer which is caused by the high regularity of the structure. While this is not a problem for low cis-1,4 polybutadiene, it would be beneficial if tire designers could have the ability to use the higher cis-1,4 content BR without crystallization, that would provide a rubber composition having a suitable complex shear modulus a low temperatures.

SUMMARY OF THE INVENTION

Particular embodiments of the present invention include methods for the in situ isomerization of polybutadiene. Such methods may include adding mixture components of the cross-linkable rubber composition into a mixer, the mixture components comprising at least 10 phr of a polybutadiene rubber having at least 80 wt % cis-bonds and up to 90 phr of a second rubber component having at least some dienic unsaturation and mixing the mixture components during a nonproductive phase. Such methods may further include processing the mixture components on a mill during a productive phase, adding at least 3 phr of a disulfide isomerization agent and mixing the disulfide isomerization agent with the mixture components. In particular embodiments the useful disulfide isomerization agents are selected from the group consisting of 2,2-dithiobis(benzothiazole), 2-nitro-p-tolyl disulfide, 4-(2-benzothiazolyldithio)morpholine, tetraethylthiuram disulfide and combinations thereof.

In particular embodiments, the mixing may take place in an internal mixer. The isomerization agent may in some embodiments be added to the mixer and in other embodiments, it may be added to the mill after the mixture components have been dropped from the mixer for cooling on the mill. The methods may further include adding a sulfur or peroxide curing agent to the mixture at the productive phase.

The foregoing and other objects, features and advantages of the invention will be apparent from the following more detailed descriptions of particular embodiments of the invention.

BRIEF DESCRIPTION OF THE DRAWINGS

FIG. 1 is a graph plotting the complex shear modulus G* of various rubber compositions over a temperature range of interest.

DETAILED DESCRIPTION OF PARTICULAR EMBODIMENTS

Particular embodiments of the present invention include methods for forming rubber articles from polybutadiene that has undergone in situ isomerization and rubber compositions that are useful in such methods and for forming rubber articles such as tire components. The isomerization of the polybutadiene results in some of the cis-1,4 bonds isomerizing to trans-1,4 bonds and such in situ isomerization may take place in particular embodiments during the mixing of the rubber compositions in internal mixers commonly used in the rubber industry and/or during curing of the rubber article.

More particularly it has been found that by adding particular isomerization agents, some also identified as vulcanization accelerators, to the internal mixer during the normal preparation of a rubber composition that the isomerization will occur. The amount of added accelerator is greater than is commonly used for curing of rubber articles if it is also used as the isomerization agent to cause the polybutadiene to isomerize in situ a portion of its cis-1,4 bonds to trans-1,4 bonds so that the resulting rubber composition will have a suitable complex shear modulus G* at low temperatures. In that case, in addition to isomerizing the rubber, the accelerator fulfills the traditional role of accelerating the vulcanization process.

However, in those embodiments disclosed herein that are cured with a peroxide curing system, the disulfide accelerators useful in a sulfur curing system are not useful as accelerators in the peroxide curing system. Therefore in peroxide cured systems the disulfides are only isomerization agents and do not serve a dual role of accelerator/isomerization agent.

As used herein, "phr" is parts per hundred parts of rubber by weight and is a common measurement in the art wherein components of a rubber composition are measured relative to the total weight of rubber in the composition, i.e., parts by weight of the component per 100 parts by weight of the total rubber(s) in the composition.

As used herein, elastomer and rubber are synonymous terms.

As used herein, "based upon" is a term recognizing that embodiments of the present invention are made of vulcanized or cured rubber compositions that were, at the time of their assembly, uncured. The cured rubber composition is therefore "based upon" the uncured rubber composition. In other words, the cross-linked rubber composition is based upon or comprises the constituents of the cross-linkable rubber composition.

As is known generally, a tire includes many different components that are made from a variety of different materials with rubber compositions making up a major portion of the tire. Different rubber compositions are used to form, for example, the treads, the sidewalls and the toe guard and the apex that are located in the bead area. Other components of a tire, such as the body plies and the steel belts, are coated with a rubber composition.

While the rubber compositions disclosed herein may be used in many of the different tire components, particular embodiments include the use of such rubber compositions in the tire tread. The tire tread is the road-contacting portion of a vehicle tire that extends circumferentially about the tire. It is designed to provide the handling characteristics required by the vehicle; e.g., traction, dry braking, wet braking, cornering and so forth—all being preferably provided with a minimum amount of noise being generated and at a low rolling resistance.

Treads of the type that are disclosed herein include tread elements that are the structural features of the tread that contact the ground. Such structural features may be of any type or shape, examples of which include tread blocks and tread ribs. Tread blocks have a perimeter defined by one or more grooves that create an isolated structure in the tread while a rib runs substantially in the longitudinal (circumferential) direction and is not interrupted by any grooves that run in the substantially lateral direction or any other grooves that are oblique thereto.

The radially outermost faces of these tread elements make up the contact surface of the tire tread—the actual surface area of the tire tread that is adapted for making contact with the road as the tire rotates. The total contact surface of the tire tread is therefore the total surface area of all the radially outermost faces of the tread elements that are adapted for making contact with the road.

While particular embodiments as disclosed herein utilize the in situ isomerized polybutadiene for tire components, such materials are also useful for other rubber articles such as conveyor belts, motor mounts and so forth.

As has been noted, polybutadiene that has a high cis-1,4 content is not a preferred material in rubber compositions that are going to be used in cold environments when the elastomer content of the rubber composition is above 10 phr of the polybutadiene. Therefore particular embodiments of the rubber compositions disclosed herein include at least 10 phr of polybutadiene and up to 90 phr of another diene rubber composition. Alternatively the rubber compositions may include at least 30 phr, at least 40 phr, at least 50 phr, at least 60 phr, at least 90 phr, at least 95 phr or 100 phr of the polybutadiene.

Since the polybutadiene is isomerized in situ, meaning during the mixing process of the rubber composition or, in particular embodiments, during the curing process of the rubber article, the polybutadiene that is added to the internal mixer to make the rubber composition has a higher cis-1,4 content than the polybutadiene that is in the rubber composition used to form rubber articles. Useful polybutadienes that may be subjected to in situ isomerization include those that have a cis-1,4 content of at least 80 wt % or alternatively at least 85 wt %, at least 90 wt % or at least 95 wt %.

The issue of using polybutadienes with higher cis-1,4 content is that they have a significant increase in their complex shear modulus at lower temperatures. Such a shift is not seen with polybutadienes that do not have the higher cis-1,4 content. While not limiting the invention, the high cis-1,4 is a more regular arrangement of the polymer chains than when a significant amount of vinyl and trans groups is introduced as irregularities. Such irregularities inhibit the polymer chains from forming a crystalline state that is more rigid than those chains with irregularities.

FIG. 1 is a graph plotting the complex shear modulus G* of various rubber compositions over a temperature range. The rubber compositions are those shown in Example 1 below. As can be seen from the graph shown in FIG. 1, the complex shear modulus G* does not rise appreciably over the range of about −20° C. and −10° C. for any of the rubber compositions shown. However the G* of the witness rubber composition W1 starts to rise significantly around −20° C. and increases to about 18 MPa at −30° C. and to about 51 MPa at −40° C.

To reduce the cis-1.4 content of the polybutadiene that is introduced into the internal mixer to prepare the rubber compositions disclosed herein, particular embodiments provide the addition of a rubber isomerization agent that causes the isomerization of the polybutadiene in situ. The isomerization agent may be characterized as a disulfide such as benzothiazyl disulfide (MBTS) which is able to dissociate at high temperature forming reactive sulfur radicals. The reactive radicals are able to reversibly bond to the cis-polybutadiene groups, temporarily converting the double bond to a single bond and enabling it to rotate to the thermodynamically favorable trans configuration.

An example of a useful isomerization agent is MBTS and examples of not so useful include N-cyclohexyl-2-benzothiazole sulfenamide (CBS) and the anti-scorch N-cyclohexy (thio) phthalimide (CTP). Other accelerators not useful for isomerization include 2-mercaptobenzothiazole (MBT) and tetrazylthiuram disulfide (TBzTD). It may appear that for successful isomerization the accelerator must be a disulfide which is not a thiuram; i.e., MBTS rather than TBzTD, although there is at least one exception to this appearance as shown in Example 2 and therefore such appearance is not totally accurate. An explanation for this appearance may be, though not limiting the invention, that the thiuram the radical is resonance-stabilized and consequently less reactive. A thiuram may be generally characterized in the form

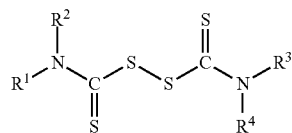

For particular embodiments of the rubber compositions disclosed herein, the isomerization agent may be added in an amount of between at least 4 phr or alternatively between at least 4 phr and 12 phr, between at least 5 phr and 10 phr, between 5 phr and 8 phr or between 6 phr and 10 phr of the isomerization agent.

Particular embodiments of the rubber compositions disclosed herein may be described as having a complex shear modulus G* of less than 10 MPa at −30° C. or alternatively less than 10 MPa at −40° C. Such G*'s are achieved by the in situ isomerization of the polybutadiene added to the internal mixer in accordance with particular embodiments disclosed herein.

Those skilled in the art will realize, therefore, that particular embodiments of the rubber compositions that have the isomerization agent as disclosed herein may be characterized as having a complex shear modulus G* at −30° C. that is no more than 80% of the complex shear modulus G* at −30° C. of a nearly identical rubber composition that is different only in that it lacks the isomerization agent component. Alternatively the complex shear modulus at −30° C. may be no more than 50% or no more than 40% or no more than 20% of such nearly identical rubber composition.

Similarly particular embodiments may be described as having a complex shear modulus G* at −40° C. that is no more than 60% of the complex shear modulus G* at −40° C. of a nearly identical rubber composition that is different in that it only lacks the isomerization agent component. Alternatively the complex shear modulus at −40° C. may be no more than 50% or no more than 40% or no more than 20% of such nearly identical rubber composition.

In addition to the polybutadiene elastomers disclosed above, particular embodiments of the rubber compositions disclosed herein may further include a second rubber component having at least some dienic unsaturation.

Diene elastomers may be classified as either "essentially unsaturated" diene elastomers or "essentially saturated" diene elastomers. As used herein, essentially unsaturated diene elastomers are diene elastomers resulting at least in part from conjugated diene monomers, the essentially unsaturated diene elastomers having a content of such members or units of diene origin (conjugated dienes) that is at least 15 mol. %. Within the category of essentially unsaturated diene elastomers are highly unsaturated diene elastomers, which are diene elastomers having a content of units of diene origin (conjugated diene) that is greater than 50 mol. %.

Those diene elastomers that do not fall into the definition of being essentially unsaturated are, therefore, the essentially saturated diene elastomers. Such elastomers include, for example, butyl rubbers and copolymers of dienes and of alpha-olefins of the EPDM type. These diene elastomers have low or very low content of units of diene origin (conjugated dienes), such content being less than 15 mol. %.

Examples of suitable conjugated dienes include, in particular, 1,3-butadiene, 2-methyl-1,3-butadiene, 2,3-di($C_1$-$C_5$ alkyl)-1,3-butadienes such as, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Examples of vinyl-aromatic compounds include styrene, ortho-, meta- and para-methylstyrene, the commercial mixture "vinyltoluene", para-tert-butylstyrene, methoxystyrenes, chloro-styrenes, vinylmesitylene, divinylbenzene and vinylnaphthalene.

The copolymers may contain between 99 wt. % and 20 wt. % of diene units and between 1 wt. % and 80 wt. % of vinyl-aromatic units. The elastomers may have any microstructure, which is a function of the polymerization conditions used, in particular of the presence or absence of a modifying and/or randomizing agent and the quantities of modifying and/or randomizing agent used. The elastomers may, for example, be block, random, sequential or microsequential elastomers, and may be prepared in dispersion or in solution; they may be coupled and/or starred or alternatively functionalized with a coupling and/or starring or functionalizing agent.

Examples of suitable second diene elastomers include polyisoprenes and butadiene/styrene copolymers, particularly those having a styrene content of between 5 wt. % and 50 wt. % or of between 20 wt. % and 40 wt. % and in the butadiene faction, a content of 1,2-bonds of between 4 mol. % and 65 mol. %, a content of trans-1,4 bonds of between 20 mol. % and 80 mol. %. Also included are butadiene/isoprene copolymers, particularly those having an isoprene content of between 5 wt. % and 90 wt. % and a glass transition temperature (Tg, measured in accordance with ASTM D3418) of −40° C. to −80° C. or −60° C. to −80° C.

Further included as suitable second diene elastomers are isoprene/styrene copolymers, particularly those having a styrene content of between 5 wt. % and 50 wt. % and a Tg of between −25° C. and −50° C. In the case of butadiene/styrene/isoprene copolymers, examples of those which are suitable include those having a styrene content of between 5 wt. % and 50 wt. % and more particularly between 10 wt. % and 40 wt. %, an isoprene content of between 15 wt. % and 60 wt. %, and more particularly between 20 wt. % and 50 wt. %, a butadiene content of between 5 wt. % and 50 wt. % and more particularly between 20 wt. % and 40 wt. %, a content of 1,2-units of the butadiene fraction of between 4 wt. % and 85 wt. %, a content of trans-1,4 units of the butadiene fraction of between 6 wt. % and 80 wt. %, a content of 1,2-plus 3,4-units of the isoprene fraction of between 5 wt. % and 70 wt. %, and a content of trans-1,4 units of the isoprene fraction of between 10 wt. % and 50 wt. %, and more generally any butadiene/styrene/isoprene copolymer having a Tg of between −20° C. and −70° C.

In summary, suitable second diene elastomers, if included for particular embodiments of the rubber compositions disclosed herein, may include highly unsaturated diene elastomers such as polyisoprenes (IR), natural rubber (NR), butadiene copolymers, isoprene copolymers and mixtures of these elastomers. Such copolymers include butadiene/styrene copolymers (SBR), isoprene/butadiene copolymers (BIR), isoprene/styrene copolymers (SIR) and isoprene/butadiene/styrene copolymers (SBIR). Particular embodiments may be limited to having only highly unsaturated diene elastomers as the second diene elastomer.

Particular embodiments of the rubber compositions disclosed herein include up to 50 phr of the second diene elastomer or up to 40 phr of the second diene elastomer. Alternatively the rubber compositions may include up to 10, up to 5 or none of the second elastomer having at least some dienic unsaturation content.

In addition to the elastomers and the isomerization agent described above, particular embodiments of the rubber compositions disclosed herein may include reinforcing filler. Reinforcing fillers are added to rubber compositions to, inter alia, improve their tensile strength and wear resistance. Useful reinforcing fillers include, for example, silica with which a coupling agent is typically associated and carbon black. Particular embodiments may include reinforcing fillers of carbon black, inorganic fillers or of combinations thereof.

In those embodiments that include only inorganic fillers (such as silica) or as the reinforcing filler, it may be noted that carbon black may still be present in small quantities to provide coloring (black) and/or UV protection. Such benefits may be obtained by adding at least 0.5 phr but no more than 20 phr of carbon black or alternatively, less than 10 phr, less than 5 phr or between 0.5 phr and 10 phr of carbon black.

Inorganic reinforcing fillers include any inorganic or mineral fillers, whatever its color or origin (natural or synthetic), that are capable without any other means, other than an intermediate coupling agent, or reinforcing a rubber composition intended for the manufacture of tires. Such inorganic reinforcing fillers can replace conventional tire-grade carbon blacks, in whole or in part, in a rubber composition intended for the manufacture of tires. Typically such fillers may be characterized as having the presence of hydroxyl (—OH) groups on its surface.

Inorganic reinforcing fillers may take many useful forms including, for example, as powder, microbeads, granules, balls and/or any other suitable form as well as mixtures thereof. Examples of suitable inorganic reinforcing fillers include mineral fillers of the siliceous type, such as silica ($SiO_2$), of the aluminous type, such as alumina ($AlO_3$) or combinations thereof.

Useful silica reinforcing fillers known in the art include fumed, precipitated and/or highly dispersible silica (known as "HD" silica). Examples of highly dispersible silicas include Ultrasil 7000 and Ultrasil 7005 from Degussa, the silicas Zeosil 1165MP, 1135MP and 1115MP from Rhodia, the silica Hi-Sil EZ150G from PPG and the silicas Zeopol 8715, 8745 and 8755 from Huber. In particular embodiments, the silica may have a BET surface area, for example, of between 60 $m^2/g$ and 250 $m^2/g$ or alternatively between 80 $m^2/g$ and 230 $m^2/g$.

Examples of useful reinforcing aluminas are the aluminas Baikalox A125 or CR125 from Baikowski, APA-100RDX from Condea, Aluminoxid C from Degussa or AKP-G015 from Sumitomo Chemicals.

For coupling the inorganic reinforcing filler to the diene elastomer, a coupling agent that is at least bifunctional provides a sufficient chemical and/or physical connection between the inorganic reinforcement filler and the diene elastomer. Examples of such coupling agents include bifunctional organosilanes or polyorganosiloxanes. Such coupling agents and their use are well known in the art. The coupling agent may optionally be grafted beforehand onto the diene elastomer or onto the inorganic reinforcing filler as is known. Otherwise it may be mixed into the rubber composition in its free or non-grafted state. One useful coupling agent is X 50-S, a 50-50 blend by weight of Si69 (the active ingredient) and N330 carbon black, available from Evonik Degussa.

Such coupling agents may be included at any suitable amount for the given application, examples of which are between 2 phr and 15 phr or alternatively, between 2 phr and 12 phr or between 3 phr and 10 phr. It is generally desirable to minimize its use. In particular embodiments, the amount of coupling agent may represent between 0.5 and 15 wt. % relative to the total weight of the silica filler. In the case for example of tire treads for passenger vehicles, the coupling agent may be less than 12 wt. % or even less than 10 wt. % or 8 wt. % relative to the total weight of the silica filler.

For those embodiments that include carbon black in the rubber compositions in quantities greater than the very small quantities mentioned above, any of the carbon blacks that may be known to be useful in rubber applications would be suitable. In such embodiments, the carbon black may be used as the sole filler or may be mixed with other reinforcing fillers, such as silica and/or other inorganic reinforcing fillers.

Suitable carbon blacks include, for example, those of the type HAF, ISAF and SAF, conventionally used in tires. Reinforcing blacks of ASTM grade series 100, 200 and/or 300 are suitable such as, for example, the blacks N115, N134, N234, N330, N339, N347, N375 or alternatively, depending on the intended application, blacks of higher ASTM grade series such as N660, N683 and N772.

In particular embodiments, the amount of reinforcing filler, whether it is limited to just carbon black, just inorganic fillers or combinations thereof, may be between 30 phr and 200 phr or alternatively between about 40 phr and 150 phr.

In addition to the elastomers, the WHAT and the reinforcing fillers, particular embodiments of the rubber compositions disclosed herein may further include a platicizing system as known in the art. Such plasticizers may include resins and/or oils including both petroleum based oils and/or vegetable oils. Such systems are well known in the art.

The rubber compositions disclosed herein may be cured with any suitable curing system including a peroxide curing system or a sulfur curing system. Particular embodiments are cured with a sulfur curing system that includes free sulfur and may further include, for example, one or more of accelerators, stearic acid and zinc oxide. Suitable free sulfur includes, for example, pulverized sulfur, rubber maker's sulfur, commercial sulfur, and insoluble sulfur. The amount of free sulfur included in the rubber composition is not limited and may range, for example, between 0.1 phr and 10 phr or alternatively between 0.2 phr and 5 phr or between 0.2 phr and 3 phr. Particular embodiments may include no free sulfur added in the curing system but instead include sulfur donors.

Those embodiments that may be cured with a peroxide curing system may include an organic peroxide as a peroxide curing agent, examples of which may include di-cumyl peroxide; tert-butyl cumyl peroxide; 2,5-dimethyl-2,5 bis (tert-butyl peroxy)hexyne-3; bis(tert-butyl peroxy isopropyl)benzene; n-butyl 4,4'-di(tert-butyl peroxy) valerate; 1,1-di-tert-butylperoxy-3,3,5-trimethylcyclohexane; bis-(tert-butyl peroxy)-diisopropyl benzene; t-butyl perbenzoate; di-tert-butyl peroxide; 2,5-dimethyl-2,5-di-tert-butylperoxide hexane and combinations thereof. The amount of peroxide curing agent useful in particular embodiments is not limited and may range, for example, between 0.1 phr and 10 phr. Particular embodiments may utilize the peroxide at between 0.1 phr and 5 phr or alternatively, between 0.5 and 3.5 phr. It may be noted that those embodiments that are cured with peroxide may contain no disulfide accelerators (which are further discussed below) since such accelerators are not useful in peroxide curing systems. Therefore particular embodiments of the rubber compositions include none of the disulfide accelerators—as accelerators—though of course the disulfides added as isomerization agents are included in such peroxide-cured rubber compositions.

It should be noted that when certain disulfides are added to the rubber compositions, even when they are sulfur cured, there is still the surprising result of obtaining isomerization of the polybutadiene. Therefore there are particular embodiments that include the addition of a disulfide as an isomerization agent which may—or may not—further act in a dual role as an accelerator for sulfur cured systems.

Accelerators are used to control the time and/or temperature required for vulcanization and to improve the properties of the cured rubber composition. Particular embodiments of the present invention include one or more accelerators. One example of a suitable primary accelerator useful in the present invention is a sulfenamide. Examples of suitable sulfenamide accelerators include n-cyclohexyl-2-benzothiazole sulfenamide (CBS), N-tert-butyl-2-benzothiazole Sulfenamide (TBBS), N-Oxydiethyl-2-benzthiazolsulfenamid (MBS) and N'-dicyclohexyl-2-benzothiazolesulfenamide (DCBS). Combinations of accelerators are often useful to improve the properties of the cured rubber composition and the particular embodiments include the addition of secondary accelerators.

Particular embodiments may include as a secondary accelerant the use of a moderately fast accelerator such as, for example, diphenylguanidine (DPG), triphenyl guanidine (TPG), diorthotolyl guanidine (DOTG), o-tolylbigaunide (OTBG) or hexamethylene tetramine (HMTA). Such accelerators may be added in an amount of up to 4 phr, between 0.5 and 3 phr, between 0.5 and 2.5 phr or between 1 and 2 phr. Particular embodiments may exclude the use of fast accelerators and/or ultra-fast accelerators such as, for example, the fast accelerators: disulfides and benzothiazoles; and the ultra-accelerators: thiurams, xanthates, dithiocarbamates and dithiophosphates.

Other additives can be added to the rubber compositions disclosed herein as known in the art. Such additives may include, for example, some or all of the following: antidegradants, antioxidants, fatty acids, waxes, stearic acid and zinc oxide. Examples of antidegradants and antioxidants include 6PPD, 77PD, IPPD and TMQ and may be added to rubber compositions in an amount, for example, of from 0.5 phr and 5 phr. Zinc oxide may be added in an amount, for example, of between 1 phr and 6 phr or alternatively, of between 1.5 phr and 4 phr. Waxes may be added in an amount, for example, of between 1 phr and 5 phr.

Particular embodiments provide methods for making rubber articles from the rubber compositions disclosed herein as well as methods for making such compositions. Such methods may include the in situ isomerization of polybutadiene rubber to reduce the number of cis-1.4 bonds by converting them to trans-1,4 bonds.

The in situ isomerization may take place in a mixer suitable for mixing the rubber components with the other components of the rubber composition such as the reinforcing filler and plasticizers and curing activators. Alternatively the in situ isomerization may also take place during the curing (vulcanization) of the rubber article. For example, if the isomerization agent is not added into the internal mixer but only onto the mill, then the isomerization will take place essentially only during vulcanization. If it is added into the internal mixer, then the isomerization will start during the mixing process and continue during the curing of the article. It should be noted that the curing agents—such as sulfur or peroxide—are not typically added to the internal mixer because the temperatures generated during the mixing process would start the vulcanization process should they be added to the mixer.

Internal mixers are well known in the rubber industry, one brand of internal mixer being the Banbury mixer. The mixing takes place in batches and typically includes mixing with large counter-rotating paddles that shear the material in the mixer and mix it. Such action creates heat and the temperature in the mixer rises during the mixing process. Often the temperature may be monitored to determine when to drop the mixture out of the internal mixer as a determinant that the mixing process is complete. If the internal mixer is used, the polybutadiene rubber is added in a solid form, that is not in form that is liquid such as would be the case if the polybutadiene were dissolved or otherwise disposed in a solvent.

Particular embodiments of such methods disclosed herein include adding the mixture components of the cross-linkable rubber composition into a chamber of the internal mixer. Such cross-linkable rubber compositions are those described above that are suitable for forming rubber articles. The rubber components include the polybutadiene rubber as described above and may as well include a limited quantity of one or more other rubber components as described above. In particular embodiments the mixture components that are added to the internal mixer chamber may include the curing activators such as stearic acid and/or zinc oxide. When added with the mixture components, the stearic acid may, for example, be added in an amount of at least 1 phr and the zinc oxide may be added in an amount of at least 1 phr Also added to the internal mixer are at least 3 phr of the isomerization agent. It is this isomerization agent that initiates the isomerization of the polybutadiene.

Particular embodiments of the methods disclosed herein further include mixing the mixture components in the internal mixer chamber. During the mixing the internal temperature within the internal mixer chamber will increase due to the work being performed by the mixer on the mixture components. Such methods may further include generating through the mixing an internal temperature of at least 140° C. Alternatively the internal temperature may be between 140° C. and 190° C. or between 150° C. and 170° C. Particular embodiments of the invention include maintaining the temperature for between 5 min and 10 min to allow further isomerization to take place. Other embodiments may include dropping the mix once a temperature of 165° C. is reached, with total mixing time of 3-5 min, in which case isomerization continues during rubber curing.

Particular embodiments of the methods disclosed herein may further include dropping the mixture form the internal mixer and forming the rubber article. The first phase (also referred to as the "non-productive" phase) of the mixing process as described above is the thermal-mechanic phase working at a higher temperature and is intended to thoroughly mix, typically by kneading, all the components of the rubber mixture except for the vulcanization system, such as the sulfur. It is followed by a second phase of mechanical working at a lower temperature.

The second phase of mechanical working is sometimes referred to as the "productive" phase. This finishing phase consists of incorporating by mixing the vulcanization (or cross-linking) system (sulfur or sometimes other vulcanizing agent), in a suitable device, for example an open mill. Therefore such methods would include adding a sulfur or peroxide curing agent to the mixture at the productive phase. In particular embodiments of the methods disclosed herein, it is performed for an appropriate time (typically between 1 and 30 minutes, for example between 2 and 10 minutes) and at a sufficiently low temperature lower than the vulcanization temperature of the mixture, so as to protect against premature vulcanization. In particular embodiments of the invention, the isomerizing agent may also be added during this phase. When the temperature is increased to cure the product, isomerization will take place.

The rubber composition can be formed into useful articles, including treads for use on vehicle tires. Forming rubber articles is well known in the art and may include, for example, extrusion and/or molding. As is known, extruders produce long continuous products such as tubing, tire treads and wire coverings. Such articles can be formed by extruders in various profiles that can then be cut into lengths of product. Calenders can form the rubber composition into wide sheets and can be calendered onto fabrics and/or metal wires to form, for example, tire plies, tire reinforcements and/or belts. Rubber articles may optionally also be formed with injection molding processes as is known in the art.

The treads may be formed as tread bands and then later made a part of a tire or they be formed directly onto a tire carcass by, for example, extrusion and then cured in a mold.

As such, tread bands may be cured before being disposed on a tire carcass or they may be cured after being disposed on the tire carcass. Typically a tire tread is cured in a known manner in a mold that molds the tread elements into the tread, including, e.g., the sipes molded into the tread blocks.

The invention is further illustrated by the following examples, which are to be regarded only as illustrations and not delimitative of the invention in any way. The properties of the compositions disclosed in the examples were evaluated as described below and these utilized methods are suitable for measurement of the claimed properties of the present invention.

Modulus of elongation (MPa) was measured at 10% (MA10) at a temperature of 23° C. based on ASTM Standard D412 on dumb bell test pieces. The measurements were taken in the second elongation; i.e., after an accommodation cycle. These measurements are secant moduli in MPa, based on the original cross section of the test piece.

Dynamic properties (G*) for the rubber compositions were measured on a Metravib Model VA400 ViscoAnalyzer Test System in accordance with ASTM D5992-96. The response of a sample of vulcanized material (double shear geometry with each of the two 10 mm diameter cylindrical samples being 2 mm thick) was recorded as it was being subjected to an alternating single sinusoidal shearing stress of a constant 0.7 MPa and at a frequency of 10 Hz over a temperature sweep from −60° C. to 100° C. with the temperature increasing at a rate of 1.5° C./min. The complex shear modulus G* at was recorded over the temperature sweep.

Near infrared (NIR) spectroscopy is used to quantitatively determine the weight content of styrene (if any) in the elastomer and also its microstructure (relative distribution of the 1,2-vinyl, trans-1,4- and cis-1,4-butadiene units in wt %). The principle of the method rests on the Beer-Lambert law applied to a multicomponent system. Since the method is indirect, it calls for a multivariate calibration [Vilmin, F.; Dussap, C.; Coste, N. Applied Spectroscopy 2006, 60, 619-29] carried out using standard elastomers having a composition determined by $_{13}$C NMR. The styrene content and the microstructure are then calculated from the NW spectrum of an elastomer film of around 730 μm in thickness. The acquisition of the spectrum is carried out in transmission mode between 4000 and 6200 cm$^{-1}$ with a resolution of 2 cm$^{-1}$, using a Bruker Tensor 37 Fourier transform NIR spectrometer equipped with a Peltier-cooled InGaAs detector.

The determination of the %-trans of the polybutadiene (±1%) was determined by the FTIR absorbance spectrum of the polymer. Using Attenuated Total Reflectance Fourier Transform Infrared Spectroscopy (ATR-FTIR) on an instrument with a cooled mercury cadmium telluride detector to evaluate the height of the absorption peaks, the height of individual peaks is proportional to the concentration of atomic functional groups such as cis-C=C and trans-C=C. The observed decrease in the peak due to the cis conformation at 13.6 μm, or observed increase in the trans band at 10.35 μm, normalized by the CH$_2$ band at 6.9 μm, was used to quantify the extent of isomerization. The method was calibrated using samples which were completely isomerized to the equilibrium 95%, following M. A. Golub (M. A. Golub, Journal of Polymer Science, Vol. XXV, Issue no. 110 (1957)).

Example 1

This example provides the physical characteristics showing the in situ isomerization of the polybutadiene. Rubber compositions were prepared using the components shown in Table 1. The amount of each component making up the rubber compositions shown are provided in parts per hundred parts of rubber by weight (phr). The polybutadiene had a cis-14 content of 98% and a trans-1.4 content of 1.5%.

The carbon black used was a grade typical for tire tread compositions, N234. About 10.2 phr of typical antioxidants and antiozonants were added to the rubber composition. The cure package included stearic acid, zinc oxide, accelerators and sulfur.

TABLE 1

Rubber Formulations and Physical Properties

| | W1 | W2 | F1 | F2 | F3 | F4 |
|---|---|---|---|---|---|---|
| Formulations | | | | | | |
| NR | 35 | 35 | 35 | 35 | 35 | 35 |
| BR | 65 | 65 | 65 | 65 | 65 | 65 |
| Carbon Black, N234 | 54 | 54 | 54 | 54 | 54 | 54 |
| MTBS Isomerization Agent | 0 | 0 | 3 | 4.5 | 6 | 6 |
| CBS | 0 | 9 | 0 | 0 | 0 | 0 |
| Additives | 6 | 6 | 6 | 6 | 6 | 6 |
| Cure Package (SAD, S, ZnO) | 5.3 | 4.45 | 4.6 | 4.5 | 4.45 | 4.45 |
| Physical Properties | | | | | | |
| MA10 @23° C. | 5.4 | 6.0 | 4.6 | 5.5 | 5.1 | 4.8 |
| G* at −30° C., MPa | 18 | 16 | 7 | 5 | 4.4 | 3.7 |
| G* at −40° C., MPa | 51 | 55 | 31 | 23 | 8.9 | 5.8 |
| %-trans | | | | 21 | 28 | |

The rubber compositions were prepared in a Banbury mixer by mixing the components given in Table 1, except for the sulfur, in a mixer until all components were well dispersed and a temperature of between 155 and 165° C. was reached. The sulfur was added in a second phase on a mill. The accelerator/isomerizing agent MBTS was added on the mill in the case of examples F1-F3, and in the internal mixer in the case of example F4. In the case of F4, the mixture was dropped as soon as the temperature in the mixer reached about 165° C.

The complex modulus G* versus temperature are plotted in FIG. 1. It is observed that the high-cis polybutadiene used in the witness W1 has a very high modulus at −30° C., 18 MPa. This may adversely affect fatigue performance. Adding progressively more MBTS (3 phr, 4.5 phr, 6 phr) during the "productive" mixing stage reduces the modulus to 7, 5, 4.4 MPa, respectively, improving performance. Adding 6 phr of MBTS during the earlier non-productive mixing stage allows more time for isomerization, reducing the modulus further to 3.7 MPa.

Example 2

Using the same methods as described in Example 1, rubber compositions were prepared to determine the efficacy of a selection of disulfide isomerization agents. Table 2 provides the agents that were tested with the amounts (phr) of the agents added to the rubber compositions. Also included are the %-trans bonds of the different formulations.

TABLE 2

Tested Materials

| Agent | Acronym | CAS# | phr | %-trans |
|---|---|---|---|---|
| 2,2-Dithiobis(benzothiazole) | MBTS | 120-78-5 | 6 | 31% |
| 2-Nitro-p-tolyl disulfide | DNTDS | 35350-31-3 | 6.1 | 13% |

TABLE 2-continued

Tested Materials

| Agent | Acronym | CAS# | phr | %-trans |
|---|---|---|---|---|
| 4-(2-Benzothiazolyldithio)morpholine | MBD | 95-32-9 | 5.1 | 8% |
| Tetraethylthiuram disulfide | TETD | 97-77-8 | 5.4 | 22% |
| 2, 2,2'-Dipyridyl disulfide | DPDS | 2127-03-9 | 4.0 | 3% |
| Dithiobenzoic acid | DBADS | 119-80-2 | 5.5 | 3% |
| Bis(4-chlorophenyl) disulfide | CDPDS | 1142-19-4 | 5.2 | 3% |
| ditolyl disulfide | DTDS | 103-19-5 | 4.4 | 2% |
| ditertbutyl disulfide | tBuDS | 110-06-5 | 3.2 | 2% |
| dibutyl disulfide | BuDS | 629-45-8 | 3.2 | 1% |
| zinc 2-mercaptobenzothiazole | ZMBT | 155-04-4 | 7.2 | 4% |
| zinc diethyldithiocarbamate | ZDEC | 14324-55-1 | 6.5 | 2% |
| diphenyl thiourea | DPTU | 102-08-9 | 4.1 | 2% |
| 1-Bromodecane | BrDc | 112-29-8 | 4.0 | 1% |

Table 2 demonstrates that of the agents tested, only the first four were particularly useful for the isomerization of the polybutadiene. This Example demonstrates that not all disulfides can isomerize cis-polybutadiene. It is likely that there are other useful disulfide isomerization agents.

Example 3

This Example demonstrates the usefulness of a peroxide curing agent for the isomerization of the polybutadiene. Rubber compositions were prepared using the components shown in Table 3 and using the same methods as in Example 1 for formulations F1-F3.

TABLE 3

Formulations with Sulfur or Peroxide Cure

| | Formulations | | | |
|---|---|---|---|---|
| | W3 | F5 | W4 | F6 |
| BR | 100 | 100 | 100 | 100 |
| Carbon Black, N234 | 40 | 40 | 40 | 40 |
| MTBS Isomerization Agent | 6 | 6 | 6 | 6 |
| Stearic Acid | | 2 | | |
| ZnO | | 3 | | |
| Soluble Sulfur | | 0.8 | | |
| Vulcup Peroxide | | | | 4 |

After the compositions were formulated, they were heated to 150° C. and held for 30 minutes to determine the effect of just heating. Then the sulfur curing system was added to formulation F5 and the peroxide curing system was added to formulation F6.

The results of the isomerization are presented in Table 4.

TABLE 4

%-trans Bonds

| | W3 | F5 | W4 | F6 |
|---|---|---|---|---|
| No heat or curatives, % | 4 | | 2 | |
| Heat but no curatives, % | | 31 | | 34 |
| Heat with curatives, % | | 21 | | 59 |

It may be noted that the sulfur cure resulted in a decrease in the isomerization that was obtained before cure while the peroxide improved the isomerization significantly. Note that although 59% of isomerization is much more than is required, it is desirable to have the most efficient isomerization process possible to reduce the amount of the isomerization agent needed for the reaction.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A method for forming a rubber article from a cross-linkable rubber composition, the cross-linkable rubber composition having undergone in situ isomerization, the method comprising:
   adding mixture components of the cross-linkable rubber composition into a mixer, the mixture components comprising at least 10 phr of a polybutadiene rubber having at least 80 wt % cis-bonds and up to 90 phr of a second rubber component having at least some dienic unsaturation;
   mixing the mixture components during a nonproductive phase;
   processing the mixture components on a mill during a productive phase;
   adding at least 3 phr of a disulfide isomerization agent into the mixer during the nonproductive phase;
   mixing the disulfide isomerization agent with the mixture components; and
   forming the rubber article.

2. The method of claim 1, wherein the disulfide isomerization agent is selected from the group consisting of 2,2-dithiobis(benzothiazole), 2-nitro-p-tolyl disulfide, 4-(2-benzothiazolyldithio)morpholine, tetraethylthiuram disulfide and combinations thereof.

3. The method of claim 1, wherein mixing the mixture components during a nonproductive phase further comprises, wherein the mixing occurs in an internal mixer chamber.

4. The method of claim 3, further comprising:
   generating through the mixing an internal temperature of at least 165° C. in the internal mixer chamber; and then
   dropping the mixture components from the internal mixer.

5. The method of claim 1, wherein the mixture components comprise at least 40 phr of the polybutadiene rubber.

6. The method of claim 1, wherein the second rubber component has a glass transition temperature of no more than −50° C.

7. The method of claim 1, wherein the second rubber component is selected from wherein the second rubber component is selected from a second polybutadiene rubber, natural rubber or a styrene-butadiene rubber.

8. The method of claim 1, wherein the mixture components comprise 100 phr of the polybutadiene rubber.

9. The method of claim 1, wherein the polybutadiene comprises at least 95 wt % cis-bonds.

10. The method of claim 1, wherein the polybutadiene comprises at least 85 wt % cis-bonds.

11. The method of claim 1, wherein the isomerization agent is tetraethylthiuram disulfide (TETD).

12. The method of claim 1, wherein the isomerization agent is 2, 2'-dithiobis(benzothiazoles) (MBTS).

13. The method of claim 1, wherein the mixture components include between 4 phr and 10 phr of the isomerization agent.

14. The method of claim 1, wherein the mixture components include between 6 phr and 10 phr of the isomerization agent.

15. The method of claim 1, wherein the method further comprises adding a sulfur or peroxide curing agent to the mixture at the productive phase.

16. The method of claim 15, wherein the curing agent is peroxide.

17. The method of claim 1, wherein the rubber article is a component of a tire and wherein forming the rubber article further comprises:
   forming the rubber article as a tire tread.

\* \* \* \* \*